May 14, 1963

H. P. GAY 3,089,341

QUICK-RESPONSE TEMPERATURE-CORRECTED
INTERNAL-TYPE PRESSURE GAGE

Filed March 22, 1960

INVENTOR
HERMAN P. GAY

Witness:
Ed S. Smith

S. J. Rotondi & A. J. Dupont

United States Patent Office 3,089,341
Patented May 14, 1963

3,089,341
QUICK-RESPONSE TEMPERATURE-CORRECTED
INTERNAL-TYPE PRESSURE GAGE
Herman P. Gay, Rte. 1, Box 360, Aberdeen, Md.
Filed Mar. 22, 1960, Ser. No. 16,901
8 Claims. (Cl. 73—398)
(Granted under Title 35, U.S. Code (1952), sec. 266)

The invention described herein may be manufactured and used by and for the Government for governmental purposes, without the payment of any royalty thereon to me.

This invention relates generally to apparatus for measuring static or dynamic pressure, but more particularly to a device for measuring very large and sudden changes of pressure such as occur in guns, shock tubes, or in other structures or materials exposed to explosive types of loading.

One object of the invention is to provide a device which will indicate the static or dynamic pressure at a given location.

A main object is to provide a miniaturized, highly responsive and accurate gage for pressure at a point, in which the gage has a minimum number of components and is compensated for changes in gage temperature.

A related object of the invention is to provide a device which will respond nearly instantaneously to pressures which change rapidly.

Another object of the invention is to provide a device in which the sensitivity to pressure is not affected by variations in the ambient temperature.

And still another object of the invention is to provide a device in which the accuracy is not affected by either sudden extreme changes of temperature associated with the rapid changes of pressure or gradual changes of temperature of the device.

With these and other objects in view, the invention consists of certain novel details of construction, combination and arrangement of parts, as will be more fully hereinafter set forth and pointed out in the claims.

In the measurement of rapidly changing pressures, difficulty is experienced with existing large devices because their natural frequency is low and they cannot follow or accurately indicate rapid changes. Also, they are sometimes affected by the sudden changes of temperature associated with sudden changes of pressure. For example, in the piezoelectric type gage, the pressure is transmitted to the crystals by a piston, the weight of which degrades the natural frequency of the gage and which piston sometimes binds against its cylinder. To obtain sufficient sensitivity with a diaphragm type gage, the diaphragm must be either thin or of large diameter, so that its fundamental, or lowest natural frequency is relatively small. In addition, diaphragm gages are especially sensitive to sudden changes of temperature.

In the usual strain-type pressure gages, the strain-sensitive filament is located on the outer surface of a pressure chamber which is connected to the source of pressure. The pressure must therefore be transmitted along the chamber, so that the natural frequency of the usual gage is limited by the organ pipe frequency of the chamber. Even when the chamber is filled with grease or some other substance to decrease the transit time, the response of the usual strain type pressure gage is still inadequate for measuring rapidly changing pressures.

I have discovered that, by attaching the filament to the inner cylindrical surface of a gage with the outer surface under pressure, I have been able to so miniaturize the gage that it is most responsive and sensitive to changes of pressure. Further I discovered a way to make sensitivity relatively unaffected by changes in ambient temperature. Also my gage is so small that it measures the pressure substantially at a point, and its natural frequency is so high that it responds very rapidly to sudden changes of pressure.

The gage in the present invention uses no piston or pressure chamber. Instead of locating the strain-sensitive filament on the outside of a pressure chamber, it is located on the inner circumference of a cylindrical thimble-like member which is subjected to the pressure on its outer surface. Since the cylindrical member is exposed directly to the pressure, there is no transit time or lag of the pressure in any gage chamber or conduit connecting the chamber to the source of pressure. The natural frequency of this internal gage is consequently much greater, being fixed only by Young's modulus and density of the material and the very small dimensions of the cylindrical member. In addition, the circumferential strain at the inner wall of any thick cylindrical pressure vessel is much greater than that at the outer wall, so that under the same conditions, this internal gage is by far the more sensitive to change of pressure. For very large pressures, the usual strain type pressure gage is not practical because the strain at its outer wall (or filament attached thereto) is very much less than the corresponding safe strain at the inner wall produced by pressure acting thereon. In addition, my gage "fails safe" as regards disruption by excessively high pressure.

Although two or four electrically strain-sensitive filaments could have been used to increase the resistance-pressure sensitivity of this internal gage and to minimize the effects of changes in ambient temperature on sensitivity, I have found that a single filament provides sufficient sensitivity and permits the device to be smaller and thus to have a higher natural frequency. The effects of changes in ambient temperature on sensitivity to pressure are minimized in this device by proper choice of materials, as will be described later. To minimize the effects of extremely large and sudden changes of temperature, the outer part of the device is covered with a thin, highly compliant, thermal insulator.

Referring to the figures in which like parts are indicated by similar reference characters:

Figure 1:
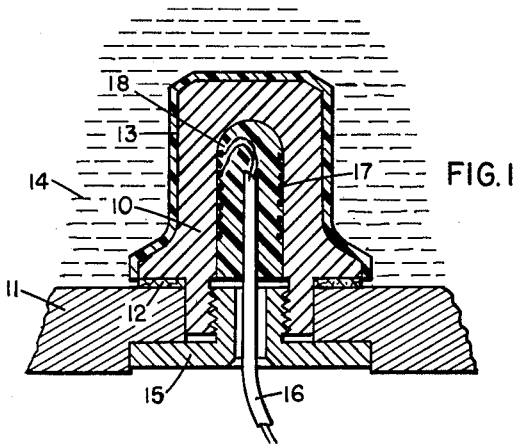
FIG. 1 is a longitudinal sectionalized view of the gage mounted in a pressure vessel, the section being taken through the center of the gage.

Referring again to FIG. 1, the numeral 10 indicates a cylindrical metal thimble, having a reduced outside diameter at the lower open end. The lower part of the thimble fits snugly into a hole in the wall 11 of a pressure vessel. An outside shoulder of the thimble is seated against a gasket 12 that prevents leakage from the pressure vessel. The upper part of thimble 10 is covered with a thin, highly compliant thermal insulator 13 of, for example, finely ground mica in a synthetic resin or plastic having direct contact with the fluid 14. The lower open end of the thimble 10 contains internal threads to accept the threaded portion of the retaining screw 15 which holds said thimble securely against said gasket. However, under my invention, other holding and sealing means may be used. The retaining screw 15 contains a central hole through which pass the electrical leads 16. The electrically strain-sensitive filament 17 consists of very fine wire or ribbon and is supported by a mechanically weak and electrically insulating core 18 which is preferably of plastic cast around the electrical lead wires 16. The ends of the strain-sensitive filament 17 are soldered or welded to its electrical leads. The assembled plastic core 18 and the strain-sensitive filament 17 are securely bonded to the inner wall of thimble 10 with a suitable cement such as epoxy resin.

The operation of the gage is as follows: Thimble 10 is compressed inwardly by the pressure acting on its outer surface. Since both the thermal insulator 13 and the plastic core 18 are very much less rigid than the metal thimble 10, they exert little effect on its strength, and hence the inner circumference of thimble 10 is decreased in direct proportion to the pressure. The strain-sensitive filament 17, being firmly bonded to the inner surface, undergoes substantially the same strain and because of its electrically strain-sensitive behavior, its electrical resistance changes in proportion to the pressure.

The sensitivity or constant of proportionality between the change of resistance and the change of pressure can be determined prior to use by subjecting the gage to several accurately known static pressures and measuring each corresponding resistance with an appropriate electrical instrument.

Figure 2:
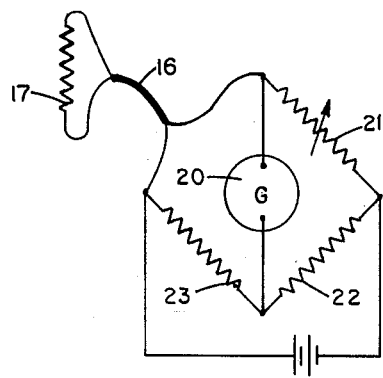
FIG. 2 is a diagram of a Wheatstone bridge, which may be used in conjunction with the gage to measure either static or dynamic pressures.

FIG. 2 shows a Wheatstone bridge circuit which, in one form of the invention, is used in conjunction with the gage to measure static pressures. The galvanometer 20 and the resistors 21, 22, 23 may be located at any convenient place within a reasonable distance from the gage. The Wheatstone bridge circuit may also be used when measuring dynamic pressures, if its galvanometer 20 is replaced by some suitable device such as an oscillograph with its amplifiers and other auxiliary apparatus.

Figure 3:
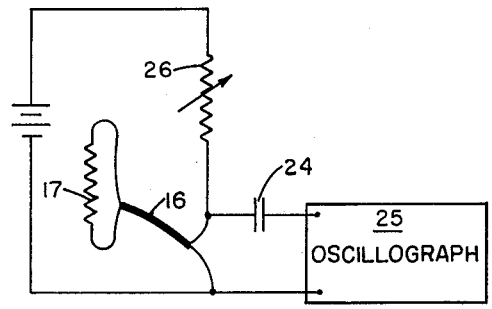
FIG. 3 is a diagram of a potentiometer circuit which may be used in conjunction with the gage to measure dynamic pressures.

Another form of the invention uses the potentiometer circuit shown in FIG. 3, which has known advantages for measuring rapid changes in pressure. The capacitor 24 blocks a steady voltage across the input of the oscillograph 25, but effectively passes rapidly changing voltages. The variable resistor 26 may be used to vary the current passing through the strain-sensitive filament 17 of the gage.

In any strain-type pressure gage, thermal strain cannot be separated from the strain associated with the pressure. Thermal insulator 13 minimizes thermal strain induced in thimble 10 by the extremely large, short duration changes of temperature associated with sudden changes of pressure. After a time, a small amount of heat may be transmitted to the thimble, but the corresponding thermal strains are relatively small; and by then the pressure generally has returned to its original value.

When the gage is to be used only at the temperature at which it is calibrated, any of the well known electrically strain-sensitive materials such as "Advance" or "Karma" may be used for the filament together with materials such as common alloys of steel, aluminum or copper for the thimble. However, the sensitivity of such a gage changes with temperature.

In general, as is well known to those skilled in the art the following relation holds for an electrically strain-responsive filament bonded to a metal:

$$\frac{1}{R}\frac{dR}{dT} \simeq b - f(c-a)$$

where R is the resistance of the bonded filament, T is the temperature, b is the temperature coefficient of resistance of the filament material, the gage factor $f = \frac{1}{\epsilon}\frac{dR}{R}$ = the percentage change of resistance per unit strain, $\epsilon$, of the unbonded filament c is the thermal expansion coefficient of the filament material and a is the thermal expansion coefficient of the metal to which the filament is bonded. The effect of this resistance change is usually minimized by using two or four strain-sensitive filaments in a Wheatstone bridge circuit. However, that arrangement does not compensate for the change of Young's modulus, E, with temperature. (This change is generally ignored, even though its effect is often ten times greater than that for the first-stated relation in changing the resistance-pressure sensitivity of the gage at different temperatures.)

Heretofore, compensation for the change in E with temperature has been obtained, in the usual gage whose strain-sensitive filaments form a Wheatstone bridge, by inserting a resistor in the line carrying potential to the bridge. The magnitude of this resistor and its change of resistance with temperature are selected so that the potential across the bridge correspondingly changes with temperature and thus compensates for the change in the resistance-pressure sensitivity associated with the change of Young's modulus.

In my invention, the following method is used to correct for the change in Young's modulus with temperature. The well known formula for the circumferential strain $\epsilon$ at the inner wall of a closed-ended cylindrical member subjected to a change of external pressure $dP$ is:

$$\epsilon = -\frac{dP}{E}\frac{D_o^2}{D_o^2 - D_i^2}(2-\nu)$$

where $D_o$ and $D_i$ are, respectively, the outer and the inner diameters of the cylinder, E is Young's modulus, and $\nu$ is Poisson's ratio of the cylinder material. The combination of the above formula with the earlier-stated expression for $f$ yields the following formula for $$S = \frac{dR}{dP}$$

the resistance-pressure sensitivity of the gage:

$$S = -\frac{fR}{E}\frac{D_o^2}{D_o^2 - D_i^2}(2-\nu)$$

From differentiation of S with respect to the temperature T, one obtains the equation:

$$\frac{1}{S}\frac{dS}{dT} = \frac{1}{R}\frac{dR}{dT} - \frac{1}{E}\frac{dE}{dT}$$

assuming $f$ and $\nu$ constant.

Thus, to eliminate the variation of resistance-pressure sensitivity with temperature, the two terms on the right side of the equation must be equal. The first term on the right is calculated as pointed out earlier herein. The desired value of the second term, the thermoelastic coefficient, is obtained by preferably using an alloy known by the trade name, "Ni-Span C," for the thimble 10. This alloy contains approximately 42.2% nickel, 5.3% chromium, 2.5% titanium, plus small amounts of other elements. By slight variations in the chromium-titanium-carbon content and by use of different heat treating temperatures, a sufficiently wide variation of the thermoelastic coefficient can be obtained to secure the desired value.

By use of a material for the bonded filament such that $$\frac{1}{R}\frac{dR}{dT}$$

is substantially zero, the variation of sensitivity can be minimized by also making $$\frac{1}{E}\frac{dE}{dT}$$

substantially zero as described above, with the two terms practically equal. The result is that both the sensitivity and the resistance of the gage are substantially independent of temperature changes.

Figure 4:
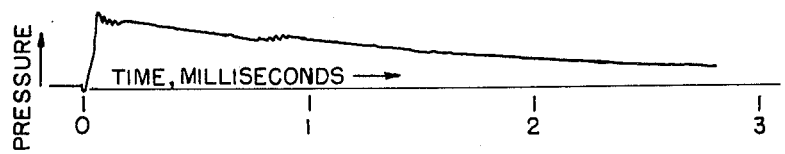
FIG. 4 is a reproduction of the recorded pressure at the downstream end of a chemical shock tube using this gage and a recording cathode-ray oscillograph.

The fidelity with which this device measures very rapid changes of pressure is illustrated in FIG. 4. The small-amplitude, high-frequency oscillations on the record show that the natural frequency of the device is approximately 37,000 cycles per second, whereas the natural frequency of conventional strain-type pressure gages is generally below 10,000 cycles per second. The observed slight increases of pressure, somewhat less than a millisecond apart, are associated with reflected shock waves. The slow decrease of pressure is due to the gradual cooling of the gas.

While for the purpose of illustrating and describing the present invention, a certain embodiment has been illustrated in FIG. 1 of the drawing, it is to be understood that the invention is not to be limited by the drawing, since such variations in the instruments employed and in their arrangement and configuration are contemplated as may be commensurate with the spirit and scope of the invention set forth in the following claims.

I claim:

1. In a pressure gage, the combination of a hollow element having a thick cylindrical wall that is deformable by pressure on its outer surface, a filament of material whose resistance varies with its strain and with the filament arranged circumferentially on the major portion of the circumference of the inner cylindrical surface, means so bonding said filament to said inner surface that the filament strain is directly responsive to that produced at said inner surface by the pressure on said outer surface, and a relatively thin, compliant, thermal insulator covering said outer surface, whereby pressure is measured with maximum sensitivity, minimum response lag, freedom from errors produced by thermal strains associated with sudden changes of temperature, and freedom from resonant oscillation of the fluid in any gage pressure chamber or pressure connection thereto.

2. In a pressure gage, the combination of a hollow cylindrical element for exposure to fluid pressure, a filament of material whose resistance varies with its strain, means so bonding said filament to the inner surface of the cylindrical element that the filament strain is directly responsive to that at the last-mentioned surface, and a relatively thin compliant, thermal insulator covering the outer surface of said element, said cylindrical element being made of an alloy having a composition and heat treating temperature such that $$\frac{1}{E}\frac{dE}{dT}$$

substantially equals $b-f(c-a)$ where $E$ is Young's modulus of elasticity, $T$ is the gage temperature, $b$ is the temperature coefficient of resistance of the filament material, $f$ is the percentage change of resistance per unit strain of the filament, and $c$ and $a$ are respectively the thermal expansion coefficients of said filament and said cylindrical element, whereby the variation of resistance-pressure sensitivity with temperature is made negligible.

3. In a fully temperature-compensated gage for measuring the pressure in a vessel, the combination of a thimble-shaped element deformable by pressure acting on its outer surface, the inner and outer diameters of said element being such that the rated maximum pressure on the element produces the maximum safe strain on its inner cylindrical surface, a relatively thin, compliant thermal insulator covering the outer surface of the thimble-shaped element, a filament made of material whose resistance varies with its strain and which filament is arranged circumferentially on the inner cylindrical surface of said element, and means so bonding said filament to said inner cylindrical surface that the filament strain is directly responsive to that produced at said inner surface by pressure acting on the adjacent outer surface, said filament material being such that the filament has negligible change of resistance with temperature when thus bonded to the element and said element being made of such a heat-treated alloy that the percentage change of Young's modulus with temperature is substantially equal to the percentage change of resistance of the bonded filament with temperature.

4. In a gage for accurately measuring the pressure in a vessel despite changes in gage temperature, the combination of a thimble-shaped element deformable by pressure acting on its outer surface, the inner and outer diameters of said element being such that the rated maximum pressure on the element produces the maximum safe strain on its inner cylindrical surface, a relatively thin, compliant thermal insulator covering the outer surface of said thimble-shaped element, a filament made of material whose resistance varies with its strain and which filament is arranged circumferentially on the inner cylindrical surface of said element, and means so bonding said filament to said inner cylindrical surface that the filament strain is directly responsive to strain produced at the said inner surface by pressure acting on the adjacent outer surface, said filament being made of such a material that the filament has negligible change of resistance with temperature when thus bonded to the element and said element being made of a nickel alloy with the composition and heat treating temperature such that the percentage change of Young's modulus with temperature is substantially equal to the percentage change of resistance of the bonded filament with temeprature.

5. In a gage for measuring the pressure in a vessel with constant sensitivity regardless of changes in gage temperature, the combination of a thimble-shaped element deformable by pressure acting on its outer surface, the inner and outer diameters of said element being such that the rated maximum pressure on the element produces the maximum safe strain on its inner cylindrical surface; a filament made of a material whose resistance varies with its strain and which filament is arranged circumferentially on the inner cylindrical surface of said element; means so bonding said filament to said inner cylindrical surface that the filament strain is directly responsive to that produced at said inner surface by pressure acting on the adjacent outer surface; said element being made of a material whose composition and heat treating temperature are such that the percentage change of Young's modulus with temperature is substantially equal to the percentage change of resistance of the bonded filament with temperature; leads connected to the filament ends and a core of a weak, electrically insulating material filling the interior of the thimble and protecting said filament and securing the leads to the core and thimble; and means for attaching the thimble to a wall of the pressure vessel and for preventing fluid from leaking past the thimble, the last-mentioned means containing a central hole for passage of said leads to the exterior of the pressure vessel.

6. In a miniaturized pressure gage, the combination of a hollow element having a thick cylindrical wall deformable by pressure on its outer surface, the material and radii of the element being such that the rated maximum gage pressure on its outer cylindrical surface produces the maximum safe strain on its inner cylindrical surface, a relatively thin, compliant thermal insulator covering the outer surface of said hollow element, a single filament made of material whose resistance varies with its strain and is arranged circumferentially on the inner surface of said hollow element, and means so bonding said filament to the inner surface that the filament strain is directly responsive to that produced at said inner surface by pressure on said outer surface, whereby the size of the hollow element is minimized so that pressure is measured substantially at a point, with maximum sensitivity, minimum response lag, and with complete freedom from resonant oscillation of the fluid in any gage pressure chamber or pressure connection thereto.

7. In a miniaturized, constant sensitivity pressure gage, the combination of a hollow element having a thick cylindrical wall deformable by pressure on its outer surface, the radii of the element being such that the rated maximum gage pressure on its outer cylindrical surface produces the maximum safe strain on its inner cylindrical surface, a relatively thin, compliant thermal insulator covering the outer surface of said hollow element, a single filament made of material whose resistance varies with its strain and is arranged circumferentially on the inner surface of said hollow element, and means so bonding said filament to the inner surface that the filament strain is directly responsive to that produced at said inner surface by pressure on said outer surface, said hollow element being made of such a heat-treated alloy that substantially equals $$\frac{1}{E}\frac{dE}{dT}$$

$$\frac{1}{R}\frac{dR}{dT}$$

where E is Young's modulus of said alloy, R is the resistance of the filament bonded in place and T is the gage temperature, whereby the size of the hollow element is minimized so that pressure is measured substantially at a point, with maximum constant resistance-pressure sensitivity over a range of gage temperatures, minimum response lag, and with complete freedom from resonant oscillation of the fluid in any gage pressure chamber or pressure connection thereto.

8. In a miniaturized, constant-sensitivity pressure gage, the combination of a hollow element having a thick cylindrical wall deformable by pressure on its outer surface, the radii of the element being such that the rated maximum gage pressure on its outer cylindrical surface produces the maximum safe strain on its inner cylindrical surface, a relatively thin, compliant thermal insulator covering the outer surface of said hollow element, a single filament made of material whose resistance varies with its strain and is arranged circumferentially on said inner surface and means so bonding said filament to the inner surface that the filament strain is directly responsive to that produced at said inner surface by pressure on said outer surface, said filament material being such that the filament has negligible change of resistance with temperature when thus bonded to the element; said hollow element being made of such a heat-treated alloy that Young's modulus thereof does not change with the temperature, whereby the size of the hollow element is minimized so that pressure is measured substantially at a point, the resistance of the bonded strain-sensitive filament is substantially unaffected by temperature, the gage has maximum constant resistance pressure sensitivity over a range of gage temperatures, and the gage has minimum response lag and complete freedom from resonant oscillation of the fluid in any gage pressure chamber or pressure connection thereto.

References Cited in the file of this patent
UNITED STATES PATENTS

| 2,367,211 | Greenfield | Jan. 16, 1945 |
| 2,398,372 | Green | Apr. 16, 1946 |
| 2,920,298 | Hines | Jan. 5, 1960 |